United States Patent [19]

Brichard et al.

[11] 4,428,914
[45] Jan. 31, 1984

[54] PROCESS FOR MAKING SODIUM PERCARBONATE GRANULES

[75] Inventors: Jean Brichard, Vilvoorde; Jean-Claude Colery, Brussels, both of Belgium

[73] Assignee: Interox, Brussels, Belgium

[21] Appl. No.: 384,101

[22] Filed: Jun. 1, 1982

Related U.S. Application Data

[63] Continuation of Ser. No. 863,700, Dec. 23, 1977.

[51] Int. Cl.³ ............................................. C01B 15/10
[52] U.S. Cl. ................... 423/265; 423/415 P; 252/186.25; 252/186.27
[58] Field of Search ................ 423/415, 415 P, 472, 423/272, 265; 252/186.25, 186.27

[56] References Cited

U.S. PATENT DOCUMENTS

| | | |
|---|---|---|
| 2,448,058 | 8/1948 | Slater et al. ........................ 423/415 |
| 2,986,448 | 5/1961 | Gates et al. ........................ 423/415 |
| 3,883,640 | 5/1975 | Smart ................................. 423/415 |
| 3,917,663 | 11/1975 | Kegelart et al. .................... 423/415 |
| 3,997,462 | 12/1976 | Denaeyer et al. .................. 423/472 |
| 4,177,097 | 9/1978 | Klebe et al. .................... 423/415 P |

FOREIGN PATENT DOCUMENTS

| | | |
|---|---|---|
| 159309 | 10/1954 | Australia .......................... 423/272 |
| 854725 | 11/1977 | Belgium . |
| 2328803 | 1/1975 | Fed. Rep. of Germany ... 423/415 P |
| 2076430 | 10/1971 | France ............................... 423/415 |
| 2099191 | 10/1972 | France . |
| 2160251 | 5/1974 | France ............................... 423/415 |
| 47-31839 | 8/1972 | Japan ................................ 423/415 |
| 23676 | of 1909 | United Kingdom .............. 423/272 |
| 549841 | 12/1942 | United Kingdom . |
| 1278059 | 6/1972 | United Kingdom . |
| 1300855 | 12/1972 | United Kingdom .............. 423/415 |
| 1418562 | 12/1975 | United Kingdom . |
| 1469352 | 4/1977 | United Kingdom ........... 423/415 P |

OTHER PUBLICATIONS

Prof. Dr. Hermann Römpp, Chemie Lexikon, Band III: M-R, pp. 3995–3998 and 5059–5062.
E. Rommel, Seifen-Öle-Fette-Wachse 103, Jg. No. 15, Sep. 1977, pp. 411–414.
"Handbook of Chemistry & Physics", CRC Press, Cleveland, Ohio, 55th Edition, 1974–1975, pp. B-139 and B-140.

*Primary Examiner*—Earl C. Thomas
*Attorney, Agent, or Firm*—Spencer & Frank

[57] ABSTRACT

A process for the production of sodium percarbonate granules comprises the steps of impregnating seeds with an aqueous phase or phases containing sodium percarbonate or its precursors, and evaporating water from the impregnated seeds in a fluidized bed dryer in the presence of at least one condensed phosphate.

11 Claims, 3 Drawing Figures

PROCESS FOR MAKING SODIUM PERCARBONATE GRANULES

CROSS REFERENCE TO RELATED APPLICATION

This application is a continuation application of applicants' copending U.S. application Ser. No. 863,700 filed Dec. 23, 1977.

BACKGROUND OF THE INVENTION

The present invention relates to sodium percarbonate granules, a process for the production of such granules, and their use in washing powders.

Hitherto, many processers have been proposed for the production of sodium percarbonate granules, but the majority of such processes produce granules which have an undesirably low resistance to attrition, or have relatively poor stability when stored either by themselves, or mixed with other constituents of washing powders.

One interesting process for the production of sodium percarbonate granules enables certain of the aforementioned difficulties to be mitigated. The process comprises the steps of introducing a solution of hydrogen peroxide and a solution of sodium carbonate into a fluidized bed containing seeds of smaller size than the granules to be obtained, and is described in French patent application No. 70.01315, filed on Jan. 14, 1970 in the name of Solvay et Cie, and published under No. 2,076,430. The granular product of this process in general has a satisfactory resistance to abrasion, but, in practice, operation of the process can present some difficulties. In fact, if each solution is sprayed into the fluidized bed using a separate atomizer, it is difficult to produce a sufficiently intimate mixture of the two solutions within the fluidized bed to give granules having the desired homogeneity. However, if the two solutions are introduced into the fluidized bed simultaneously by the same atomizer, there is a substantially increased tendency for premature crystallization to take place in the atomizer, leading to blockages of it, which therefore causes frequent stoppages of the plant.

In order to circumvent the disadvantages of introducing solutions directly into the fluidized bed, Solvay et Cie have proposed in French patent application No. 71.40860, filed on Nov. 15, 1971 and published under No. 2,160,251, a process in which the seeds are impregnated with the two solutions in a separate stage, the impregnated seeds are then passed into a fluidized bed dryer, and all particles which are smaller than the required particle size are collected at the outlet from the fluidized bed and recycled to the impregnation stage. Although this process produces homogeneous granules, it suffers from the disadvantage that a very large proportion of the granules is recycled and only a small proportion of the granules retained as product, so that the productivity of the apparatus is thus lower than desired.

Moreover, the sodium percarbonate granules obtained by the previously disclosed processes are not sufficiently stable if they are contaminated with certain metal impurities, such as iron.

SUMMARY OF THE PRESENT INVENTION

It is an object of the present invention to provide a process which ameliorates to at least some extent, one or more of the difficulties described hereinbefore in producing abrasion resistant granules of sodium percarbonate which are storage stable, in at least some embodiments.

According to the present invention there is provided a process for the production of sodium percarbonate granules comprising the steps of impregnating seeds with an aqueous phase or phases containing sodium percarbonate or its precursors, and evaporating water from the impregnated seeds in a fluidized bed dryer in the presence of at least one condensed phosphate as herein defined.

It will be recognized that when water is evaporated from the impregnated seeds, sodium percarbonate is crystallized in or on the seeds, so that the average particle size of the seeds before impregnation is smaller than that of the sodium percarbonate granules produced.

As used herein in the specification and claims, the term "condensed phosphate" means an alkali metal or ammonium compound containing at least one chain of phosphorus-oxygen-phosphorus bonds. The condensed phosphate can be a pyrophosphate, a polyphosphate or a metaphosphate. Although any alkali metal, e.g., potassium, or ammonium condensed phosphate can be used, the sodium salts are preferred. Preferred condensed phosphate include tetrasodium pyrophosphate, disodium pyrophosphate, pentasodium tripolyphosphate, sodium trimetaphosphate and sodium tetrametaphosphate. Particularly preferred condensed phosphates are metaphosphates, either linear or cyclic, having an atomic ratio of phosphorus to alkali metal of 1:1, especially hexametaphosphates and advantageously sodium hexametaphosphate.

It is to be understood that both the foregoing general description and the following detailed description are exemplary, but are not restrictive of the invention.

BRIEF DESCRIPTION OF THE DRAWINGS

Plants which can be used to carry out the process of the present invention are described hereinafter with reference to and as illustrated by the accompanying drawings, in which.

DETAILED DESCRIPTION OF THE INVENTION

Figure 1:
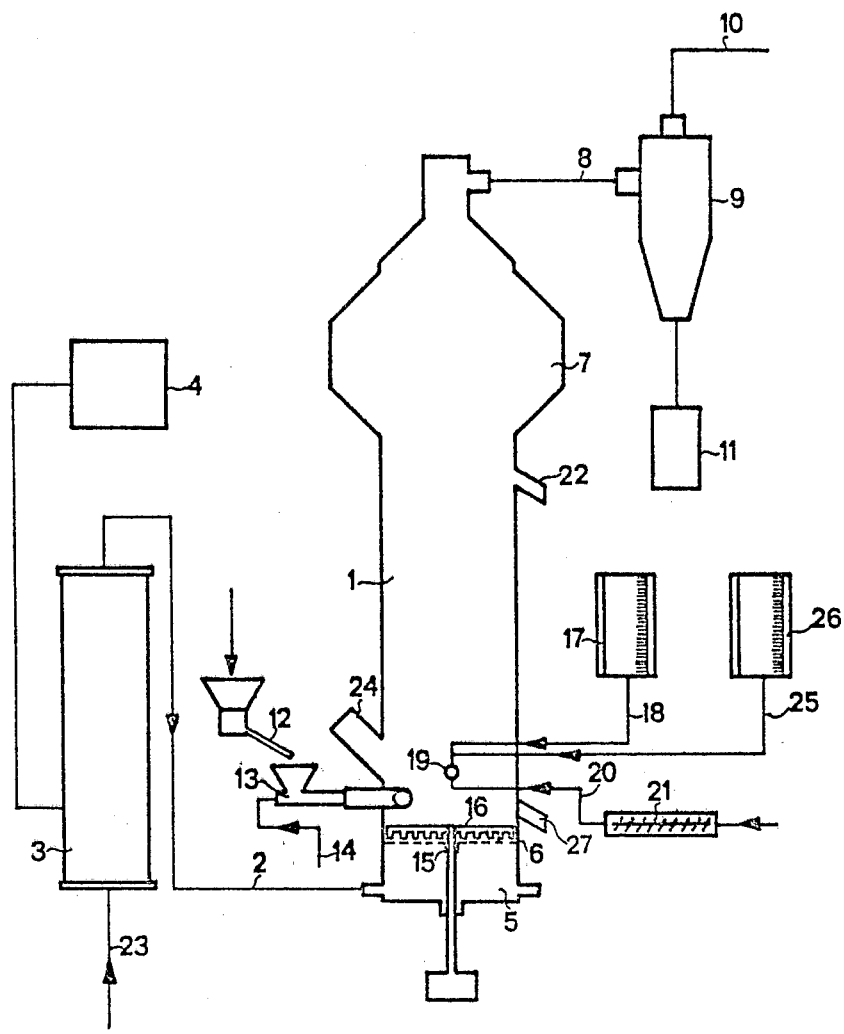
FIG. 1 is a cross-sectional view, in the vertical plane, of an apparatus which can be used to practice the present invention, which apparatus includes a cylindrical fluidized bed equipped with means for charging the bed chamber with solid particles, means for fluidizing the solid particles in the chamber, an atomizer for introducing aqueous solution into the bed and means for recovering solid particles from effluent fluidizing gas.

In the practice of the present invention, the condensed phosphate can be introduced into the dryer by various routes, which can be divided into (1) methods in which the condensed phosphate is introduced directly into the bed, and (2) methods in which the seeds are first impregnated with the condensed phosphate and then introduced into the fluidized bed. Usually the condensed phosphate is used in the form of an aqueous solution. The condensed phosphate can be introduced into the bed either by itself, generally by spraying an aqueous solution, or dissolved in the aqueous phase or phases containing sodium percarbonate or its precursor. Independent upon whether the condensed phosphate is introduced by itself or together with sodium percarbonate or a precursor thereof, the condensed phosphate may be introduced directly into the fluidized bed, or the seeds can be impregnated with the condensed phosphate before introduction of the seeds into the fluidized bed. In general, it is preferred to impregnate the seeds in the very body of the fluidized bed, not only with the aqueous phase or phases containing sodium percarbonate or its precursors, but also with the condensed phosphate. In one method, the aqueous phases comprise an aqueous solution of hydrogen peroxide and an aqueous solution of sodium carbonate, which are introduced into the fluidized bed dryer separately using separate atomizers simultaneously and in a second method, both solutions are introduced simultaneously through the same atomizer. In both methods, however, the fluidized bed dryer acts as a reactor in which formation of sodium percarbonate takes place by reaction between the sodium carbonate and the hydrogen peroxide. Alternatively, the aqueous phase can comprise a solution of sodium percarbonate, or possibly, a suspension, prepared prior to introduction of the phase into the fluidized bed, for example, by reaction between a solution of hydrogen peroxide and a solution of sodium carbonate, or by the action of sodium peroxide on sodium bicarbonate in the presence of an aqueous solution of hydrogen peroxide. However, a particularly interesting method is to use a solution of hydrogen peroxide and a solution of sodium carbonate, introduced simultaneously into the fluidized bed dryer separately or together by the same atomizer.

When the seeds are impregnated outside the fluidized bed dryer, the seeds and the aqueous phase containing sodium percarbonate in solution or possibly in suspension or comprising solutions of precursors for the sodium percarbonate are introduced into a mixer. Generally, the process employs a solution of sodium carbonate and a solution of hydrogen peroxide, which are fed into the mixer simultaneously. However, when the aqueous phase contains sodium percarbonate, it can be prepared by the methods described hereinbefore.

In practice, the phosphate is generally dissolved in at least one of the aqueous phases which would be used to impregnate the seeds, in processes using no condensed phosphate. Thus, the condensed phosphate is usually dissolved in either one or both of the hydrogen peroxide solution or the sodium carbonate solution, preferably the latter.

The amount of phosphate that can be used falls within fairly wide limits, preferably at least 0.01 g, and desirably up to 50 g of condensed phosphate per kg of sodium percarbonate, calculated as $Na_2CO_3.3/2H_2O_2$. Particularly preferably, the amount is between 0.1 and 20 g condensed phosphate per kg of sodium percarbonate on the same basis.

The concentration of hydrogen peroxide in its aqueous solution can fall within wide limits. Advantageously, the aqueous solution contains from 5 to 70% by weight hydrogen peroxide and preferably from 15 to 40% by weight. Lower concentrations of hydrogen peroxide, although feasible, are of little interest commercially because the amount of water to be evaporated becomes very large. On the other hand, it is not advisable to employ higher concentrations of hydrogen peroxide, because it can become dangerous to handle them.

The concentration of sodium carbonate in its aqueous solution can fall within fairly wide limits, the maximum being the solubility of sodium carbonate at the prevailing temperature of the solution. Desirably, the solution contains at least 5% by weight sodium carbonate and preferably from 10 to 35% by weight sodium carbonate, calculated as $Na_2CO_3$.

The mole ratio of hydrogen peroxide to sodium carbonate employed, either to form outside of the fluidized bed dryer an aqueous phase containing sodium percarbonate, or to form sodium percarbonate in situ in the fluidized bed dryer, is generally about 1.5. Normally the mole ratio is between 1.3 and 1.7 and preferably between 1.45 and 1.52. Other additives can be introduced into either the hydrogen peroxide solution or the sodium carbonate solution, or both. Such additives include stabilizers of sodium percarbonate or their precursors such as magnesium sulfate and sodium silicate, as well as corrosion inhibitors such as nitrates. Thus, in some embodiments of the present invention, the aqueous hydrogen peroxide solution contains magnesium sulfate and the aqueous sodium carbonate solution contains sodium silicate. The stabilizers for sodium percarbonate often comprise from 0.1 to 20 g of stabilizer per kg of sodium percarbonate product, calculated as $Na_2CO_3.3/2H_2O_2$, but their use is not essential.

The temperature of the fluidized bed is selected so as to avoid decomposition of sodium percarbonate, and is generally selected within the range of ambient to 100° C., frequently between 35° and 95° C., and preferably between 45° and 85° C. The temperature of the influent carrier gas, whether air or otherwise, introduced at the bottom of the fluidized bed, e.g. through a gauze or distribution plate, can fall within wide limits, and is dependent in particular upon the desired bed temperature, the amount of water to be eliminated and the flow rate of the carrier gas. In general, the influent carrier gas temperature is within the range of 80° to 250° C., and preferably between 100° and 200° C. However, it will be recognized that temperatures outside these ranges may be suitable, depending upon the other parameters, but that higher temperatures are generally avoided, if possible, because they can cause losses of hydrogen peroxide by evaporation or decomposition.

The carrier gas can be any gas that is inert chemically relative to the constituents of the fluidized bed. Such gases include nitrogen, the noble gases, oxygen or air, of which air is particularly suitable. In general, the parameters, namely flow rate of the carrier gas, temperature of the bed, in conjunction with the rate of addition of aqueous phase directly or indirectly to the bed, are controlled so as to maintain the humidity of the carrier gas at below 100%, and preferably at below 90%, so as to avoid or minimize decomposition of the sodium percarbonate.

The seeds employed in the process of the present invention are selected to be smaller than the product granules. They can be produced in various ways. At the start-up of a plant employing the process according to the present invention, the seeds are preferably small particles of sodium percarbonate obtained either from another and similar plant or from the so-called wet process. Alternatively, particles having appropriate dimensions but of other inorganic persalts such as sodium perborate monohydrate or tetrahydrate, persilicates, persulphates or perhydrated phosphates can also be used, because they too ensure relatively uniform distribution of active oxygen in the product granules.

During operation of the fluidized bed, it will be recognized that when impregnation takes place in the fluidized bed, at least a portion of the seeds comprise sodium percarbonate fines which are produced under normal conditions of operation. The amount of seeds can be increased by deliberately introducing sodium percarbonate fines into the bed or by mechanically destroying some of the granules already formed within the bed itself. or by using both methods simultaneously.

Sodium percarbonate fines which are fed into the bed can originate from reject product, after grinding outside the fluidized bed, or from excessively large granules of sodium percarbonate produced in the dryer or from the recycling of fines which were entrained in the effluent fluidizing gas and carried out of the bed, or from manufacture in another process or from the pulverization of sodium percarbonate particles or from several of these possible processes simultaneously.

The fluidized bed dryer can be equipped with one or more devices which mechanically destroy agglomerates and at the same time form seeds, such as pulverizers, agitators, or scrapers. Use of such devices serve to prevent agglomeration and packing in the bed. In large fluidized beds, such devices generally are not employed because agglomeration is usually not a significant problem, so that it is generally preferred to feed recycled sodium percarbonate or waste into such fluidized beds, when it is desired to increase the proportion of seeds in the bed. The preferred method of increasing the proportion of seeds in the bed comprises recycling the fines that have been entrained in the effluent fluidizing gas and carried out of the bed.

When the seeds are impregnated outside the fluidized bed dryer, i.e. in a separate impregnation stage, the fluidized bed is normally charged solely with the product from the impregnation stage, in which case the seeds are added to the mixer employed in the impregnation stage. The seeds will normally comprise recycled sodium percarbonate fines entrained in the fluidizing gas. Alternatively, the sodium percarbonate fines can be obtained by pulverizing over-sized sodium percarbonate granules, that is to say particles having undesirably large dimensions sieved out of the fraction of material withdrawn from the dryer that is taken as the product. The fraction of material that is taken as the product is relatively small, because it has been established in practice that the quantity of dry sodium percarbonate granules recycled to the mixer in which they are impregnated with further aqueous phase is preferably such that the product leaving the mixer has a moisture content from below 5 to 10% by weight, depending upon the type of mixer used, in order to avoid the undesirable formation of agglomerates.

When the seeds are impregnated in the fluidized bed dryer, the solution or solutions can be introduced at various points within the bed, but preferably in the lower half. The solutions can be fed into the fluidized bed at the same time separately through two different atomizers or through a single atomizer with pre-mixing being accomplished inside the atomizer or at its inlet. However, any other known method for introducing solutions into the fluidized bed can also be used.

The temperature of each solution can fall within fairly wide limits. Preferably, it does not exceed the prevailing temperature in the fluidized bed so as to avoid premature crystallization in the atomizers when concentrated solutions are employed. In general, the temperatures are selected within the range of from ambient to 70° C., preferably between 20° and 50° C. Where two solutions are employed, they need not necessarily have the same temperature.

When the seeds are impregnated outside the fluidized bed, varous types of mixers can be employed. Continuous mixers are very suitable, for example a screw mixer, or a rotating drum fitted with a scraper, or a trough equipped with one or two shafts carrying paddles.

The process according to the present invention can be conducted as a continuous process or a batch process.

The fluidized bed dryer can conveniently be cylindrical, cylindroconical or parallelpipedic, but it will be recognized that other geometrical shapes could also be used satisfactorily. The fluidized bed dryer can be charged with solid material using any method known in itself for this purpose, for example a Venturi system. In practice, the charge usually has a mean particle diameter of below 0.4 mm and mostly between 0.01 and 0.35 mm, but it will be apparent that such values are given only by way of example, and depending upon the desired product, the solid charge could have a different particle size range. Discharge of the granules from the fluidized bed can be effected by any known device, for example by elutriation through the bottom of the dryer or through a side tube fitted at the bottom of the dryer, or by over-flow through a side tube, this tube then determining the height of the fluidized bed.

Effluent gases from the fluidized bed pass through a fines separator, for example, a cyclone. After the fines have been removed from them, the gases can be vented to atmosphere or after their water vapor content has been diminished, preferably to zero, by drying or condensation, the gases can be partially or totally recycled.

When the impregnation of the seeds is accomplished directly in the fluidized bed dryer, the size of the granules depends largely on the quantity of seeds present in the bed, the coarseness of the granules being inversely proportional to the content of seeds. The coarseness of the granules will thus be inversely proportional to the quantity of fine granules of sodium percarbonate introduced deliberately into the bed and to the extent of use of devices for mechanical break-up of the grains (pulverizers, etc.) if any are present in the bed. The size of the granules also depends on the pressure of the gas in the jet or jets for feeding the solution into the fluidized bed, the coarseness of the granules being inversely proportional to the pressure. Adjustment of granule size to the required value can therefore easily be accomplished by varying the proportion of seeds in the bed, either by the introduction of seeds or by the internal break-up of the granules or by varying the pressure in the jets or by the simultaneous use of these two methods.

In a further aspect of the present invention, there are provided sodium percarbonate granules containing from 0.001 to 5% by weight condensed phosphate as hereinbefore defined. Preferably the granules contain from 0.01 to 2% by weight of the condensed phosphate. Although any of the condensed phosphates described herein can be employed, the condensed phosphate is preferably sodium hexametaphosphate.

Sodium percarbonate granules containing condensed phosphate are suitable for all the customary uses of granular sodium percarbonate, and are particularly suitable as a constituent of washing powders. It will be recognized that in comparison with granules not containing condensed phosphate, the products according to the present invention demonstrate improved stability when accidentally contaminated with metal ions, such as iron, and in the presence of conventional constituents of washing powders. Moreover, the sodium percarbonate granules have retained their homogeneity. Advantageously, in some embodiments, the process according to the present invention enables reagents to be introduced by a single atomizer directly into the fluidized bed without blockage of the atomizer occurring to the same extent as before. In addition, in some embodiments, a considerable improvement in the utilization of hydrogen peroxide is observed.

Turning now to the drawings, the plant in FIG. 1 comprises a vertical cylindrical fluidized bed equipped with means for charging the bed chamber with solid particles, means for fluidizing the solid particles in the chamber, means for introducing aqueous solutions into the bed and means for recovering solid particles from effluent fluidizing gas.

The cylindrical fluidized bed comprises a lower chamber or wind box 5, provided with a fluidizing gas inlet comprising an air pipe 23 from a pump (not illustrated) leading to a preheater 3 having a regulator 4 and an air inlet line 2 leading to the wind box 5. The wind box 5 is divided from bed chamber 1 by a perforated plate 6 having a central orifice 15 through which the shaft of a fixed blade scraper 16 passes. The bed chamber 1 is provided with a Venturi tube 13, which is fed with solid particles from a vibrating conveyor 12, and air through air pipe 14, with a tube 24 through which a grinder can be introduced into the bed chamber 1 adjacent to the fixed blade scraper 16, with an overflow tube 22, and with a tube 27 through which solid particles can be elutriated. The bed chamber 1 also contains an atomizer 19 having an air feed line 20 coming from a preheater 21, a hydrogen peroxide feed line 18 coming from a thermostatic storage tank 17 and a sodium carbonate solution feed line 25 coming from a thermostatic storage tank 26. Above the bed chamber 1 is an expansion chamber 7, having an effluent fluidizing gas outlet line 8 feeding into a cyclone 9 having an air discharge ventilator line 10, and a hopper 11 for solid particles separated from the effluent fluidizing gas.

In operation, bed chamber 1 is charged with seed particles from hopper 11, conveyed along vibrating conveyor 12, into Venturi tube 13, and the particles are fluidized by gas pumped through gas line 2 into wind box 5 and thence through the perforations in plate 6. Aqueous hydrogen peroxide is fed to atomizer 19 through feed line 18, at the temperature maintained in the thermostatic storage tank 17, and aqueous sodium carbonate solution is fed through feed line 25 at the temperature maintained in the thermostatic storage tank 26 and air through feed line 20, and the mixed solutions thereby sprayed onto the particles in bed chamber 1. Fixed blade scraper 16 rotates over the surface of perforated plate 6, thereby preventing the particles from sticking to perforated plate 6 and blocking its perforations.

Figure 2:
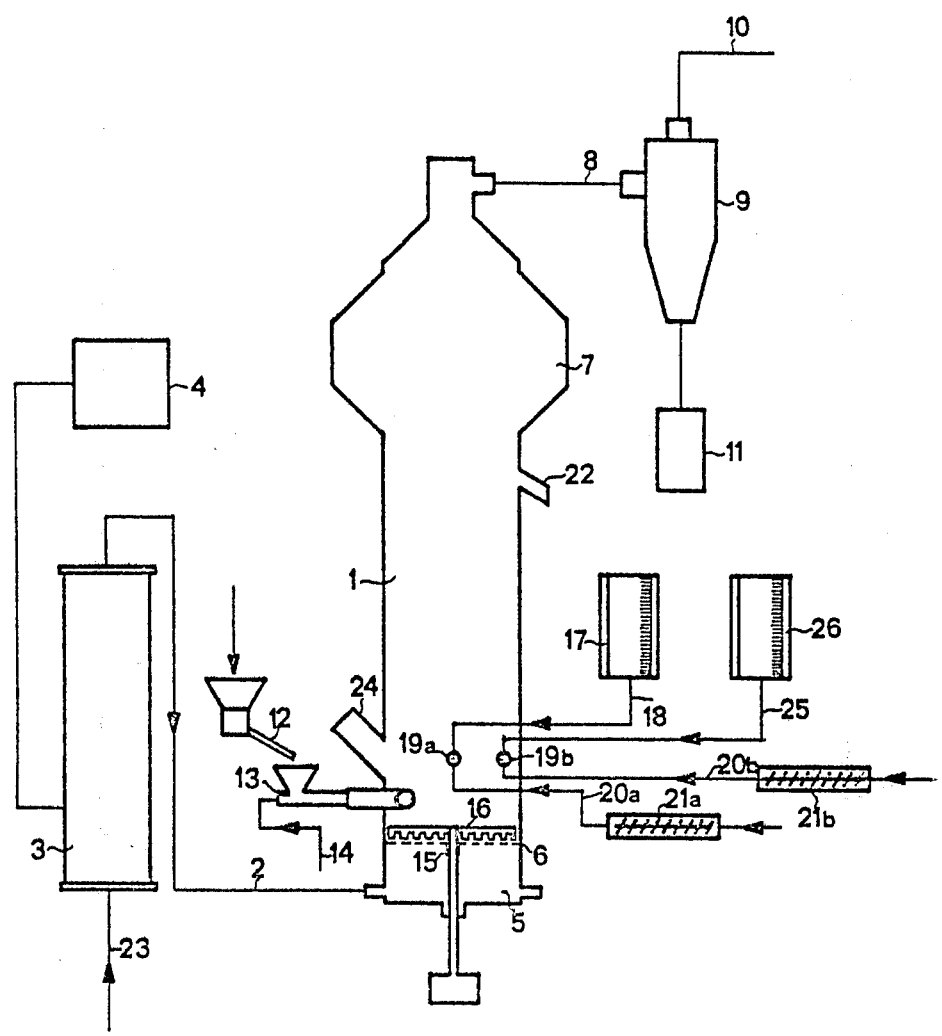
FIG. 2 is another apparatus which can be used to practice the present invention, and is identical to that shown in FIG. 1 except that the bed chamber is equipped with two atomizers.

The plant shown in FIG. 2, and its method of operation, is identical to that shown in FIG. 1, except that bed chamber 1 is equipped with two atomizers, 19a and 19b, of which atomizer 19a is fed by aqueous hydrogen peroxide feed line 18 and air line 20a and atomizer 19b is fed by aqueous sodium carbonate feed line 25 and air feed line 20b.

Figure 3:
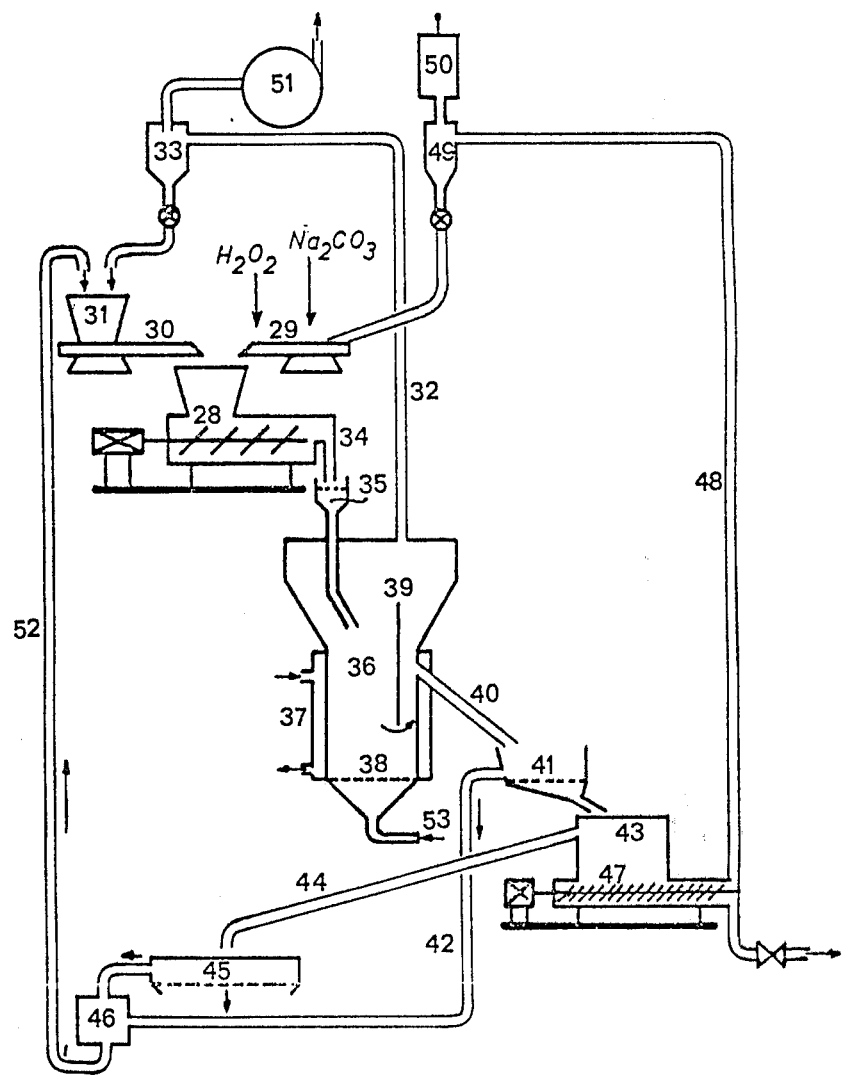
FIG. 3 is still another apparatus which can be used to practice the present invention and illustrates separate pieces of apparatus for impregnating seeds with an aqueous solution, for drying the impregnated seeds and for recycling part of the off-take from the dryer and for producing more seeds.

The plant shown in FIG. 3 comprises separate pieces of apparatus for impregnating seeds with aqueous solution, for drying the impregnated seeds and for recycling part of the off-take from the dryer and for producing more seeds. More specifically, the plant comprises a screw mixer 28, which is fed by a vibrating trough 29 and a second vibrating trough 30 which is fitted with a feed hopper 31. Mixer 28 has an overflow outlet 34 feeding a vibrating sieve 35 which discharges into a fluidized bed 36. Bed 36 is equipped with a steam jacket 37, a base plate 38, a fluidizing gas inlet line 53 and a fluidizing gas outlet line 32, a partition 39 which divides bed 36 into two compartments and a dried product take-off tube 40. Gas outlet line 32 leads via a cyclone 33 for separating out solid particles and discharging them into hopper 31, to extractor fan 51. Take-off tube 40 feeds a sieve 41 having an overflow outlet tube 42 leading to a grinder 46 from which a duct 52 leads to hopper 31. Material passing through sieve 41 passes into a hopper 43 having an overflow tube 44 feeding a sieve 45 having an overflow outlet leading to grinder 46. Hopper 43 also has an endless screw 47 for feeding material into an airfeed line 48 leading to cyclone 49 having a solid material outlet feeding vibrating trough 29, and thence to filterbag 50.

In operation, mixer 28 is fed with the seeds from vibrating trough 30 and recycled sodium percarbonate granules from vibrating trough 29. The hydrogen peroxide solution and sodium carbonate solution can be introduced directly into mixer 28 or added in vibrating trough 29. The damp product is discharged from mixer 28 in sieve 35, which breaks down agglomerates that can have been formed in the mixer 28, optionally with the assistance of a few large porcelain balls. The damp agglomerate-free sodium percarbonate is then discharged into fluidized bed dryer 36 on one side of partition 39, is dried in the bed by the updraught of air or other fluidizing gas passing into the bed from air inlet 53 through perforated base plate 38, passes underneath partition 39 into the other compartment, and dried product is taken off through tube 40. The dried material passing through tube 40 is sieved in sieve 41 and oversize particles pass through overflow outlet 42 to grinder 46 which produces seeds that are fed into hopper 31. Material passing through sieve 41 passes into hopper 43 and a proportion passes out through overflow outlet 44 into sieve 45, oversize particles then overflowing to grinder 46 and the remainder of the particles being collected as product. The remainder of the material in hopper 43 is fed by endless screw 47 into airline 48 and is extracted therefrom in cyclone 49 and filterbag 50 which feed vibrating trough 29 and thus complete the cycle. The effluent fluidizing gas carries with it sodium percarbonate fines, and is sucked through outlet line 32 and cyclone 33 by extractor fan 51. The sodium percarbonate fines are separated out by cyclone 33 and discharged into hopper 31 for recycling.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

In this Example, sodium percarbonate containing hexametaphosphate was produced, and its stability to decomposition in the presence of iron contaminant was compared with that of hexametaphosphate-free sodium percarbonate.

The products in this Example were produced in a continuous process using a plant of the type shown in FIG. 2 and described herein with respect thereto. The fluidized bed dryer which was used had a lower or main chamber having a diameter of 152 mm and extending for 915 mm above the perforated plate 6, and the upper expansion chamber had a maximum diameter of 305 mm and a height of 300 mm.

The bed was charged initially with 3 kg of seeds of sodium percarbonate fines, and then fluidized with a current of air having an initial temperature of 180° C. and a flow rate of 50 m³/h (normalized), producing a bed temperature of between 68° and 70° C. An aqueous solution containing 24.6% by weight hydrogen peroxide and 0.75% by weight magnesium sulfate heptahydrate, and having a temperature of 25° C. was sprayed through an atomizer reaching into the very body of the fluidized bed at a flow rate of 1.494 kg/h. A second aqueous solution containing 30% by weight sodium carbonate, 1.2% by weight sodium silicate (36° Baumé), sufficient ferric chloride for the product to have the iron content specified in Table 1, and 0.95% by weight sodium hexametaphosphate having the general formula $Na_6(PO_3)_6 \cdot 10H_2O$ (hereinafter called HMP) except in comparative product 7R which contained no HMP, and having a temperature of 45° C. was sprayed into the fluidized bed through a separate atomizer at a flow rate of 2.58 kg/h. The mole ratio of hydrogen peroxide to sodium carbonate was 1.48:1. The atomizers were supplied with air having a temperature of 55° to 60° C. at an effective pressure of 1 kg/cm² and at a flow rate of 3 m³/h (normalized).

The stability of products 1 to 6, according to the present invention, and comparative product 7R was then measured by determining the loss of active oxygen during storage for 2 hours at 105° C. The test comprised filling a flat bottomed glass tube having a diameter of 28.5 mm and a height of 160 mm with 50 g of sodium percarbonate of known active oxygen content, placing the tube in a chamber thermostatically controlled at 105° C., and after 2 hours removing the tube from the chamber, cooling it and pouring its contents into a flask of 140 ml of 9 N sulfuric acid and titrating with permanganate to determine the residual active oxygen content.

The loss of active oxygen shown in Table 1 for each product is expressed as a percentage and given by the expression $$\frac{C_o - C_f}{C_o} \times 100$$

where $C_o$ and $C_f$ are respectively the concentration of active oxygen of the product before and after the test.

The composition of the products and the results of the stability test are given in Table 1 below, products 1 to 6 being according to the present invention, and product 7R being present by way of comparison only.

TABLE 1

| Product No. | | 1 | 2 | 3 | 4 | 5 | 6 | 7R |
|---|---|---|---|---|---|---|---|---|
| Content of iron | mg/kg | 12 | 10 | 22 | 42 | 70 | 92 | 37 |
| Content of active oxygen ($C_o$) | g/kg | 144 | 138 | 144 | 144 | 143 | 144 | 137 |
| Content of HMP | g/kg | 6.3 | 6.3 | 6.4 | 6.4 | 6.4 | 6.4 | 0 |
| Mean particle diameter | mm | 0.360 | 0.425 | 0.370 | 0.400 | 0.355 | 0.340 | 0.425 |
| Stability: loss of active oxygen | % | 7 | 7 | 7 | 8 | 8 | 9 | 11 |

From Table 1, it will be seen that the presence of HMP improved the stability of sodium percarbonate.

EXAMPLE 2

This Example demonstrates the operational advantage of adding HMP to one of the solutions which are sprayed into a fluidized bed using only one atomizer.

In this Example, the plant used was of the type shown in FIG. 1, and described hereinbefore with respect thereto. The plant was identical to that employed in Example 1, with the exception that both the hydrogen peroxide and the sodium carbonate solutions were sprayed simultaneously into the fluidized bed through a single atomizer. The process conditions were identical to those described in Example 1, as was the hydrogen peroxide solution. The sodium carbonate solution employed in test 8 contained 30% by weight sodium carbonate, 1.2% by weight sodium silicate (36° Baumé) and 0.95% by weight HMP, and in comparison test 9R the HMP was omitted.

It was observed that test 8 could be continued for several days without the atomizer clogging, whereas in test 9R, the atomizer clogged rapidly, after about 5 minutes operation. From comparison of tests 8 and 9R it will be seen that the presence of HMP makes it much more convenient to use a single atomizer, thus enabling a relatively simple plant to be employed.

EXAMPLE 3

This Example demonstrates that use of a single atomizer together with incorporation of HMP in solution can result in better utilization of the hydrogen peroxide.

The plant employed in this Example was identical to that used in either Example 1 or Example 2, depending upon whether two or one atomizers are used. In test 10R, carried out for purposes of comparison, two atomizers were used, and the sodium carbonate solution did not contain HMP. The active oxygen content of the sodium percarbonate product represented between 95.4% and 96.8% of the hydrogen peroxide introduced into the bed. In test 11, performed in accordance with the process of the present invention, a hydrogen peroxide solution and a sodium carbonate solution which were identical to those employed in test 10R, except for the inclusion of 6.6 g/kg HMP in the sodium carbonate solution, were sprayed into the fluidized bed through a single atomizer. The active oxygen content of the product represented between 97.4% and 98.1% of the hydrogen peroxide introduced into the fluidized bed.

It will be recognized, therefore, that the presence of HMP in the sodium carbonate solution enabled better utilization to be made of the hydrogen peroxide.

It will be understood that the above-description of the present invention is susceptible to various modifications, changes and adaptations, and the same are intended to be comprehended within the meaning and range of equivalents of the appended claims.

What is claimed is:

1. In a process for the production of sodium percarbonate granules in a fluidized bed comprising the steps of:
   (a) impregnating sodium percarbonate seeds with an aqueous solution of hydrogen peroxide and an aqueous solution of sodium carbonate, and simultaneously
   (b) evaporating water from the impregnating seeds in a fluidized bed dryer in the presence of at least one condensed phosphate, the improvement comprising providing sodium hexametaphosphate as said condensed phosphate and dissolving said condensed phosphate in at least one of said solutions.

2. A process as claimed in claim 1, wherein sufficient condensed phosphate is introduced into the fluidized bed to result in granules of sodium percarbonate product which contain from 0.01 to 50 g condensed phosphate per kg product.

3. A process as claimed in claim 2, wherein sufficient condensed phosphate is introduced into the fluidized bed to result in granules of the sodium percarbonate product which contain from 0.1 to 20 g condensed phosphate per kg product.

4. A process as claimed in claim 1, wherein at least some of the seeds are particles which have been carried out of the fluidized bed in an effluent fluidizing gas, and separated therefrom.

5. A process as claimed in claim 1, wherein the condensed phosphate is dissolved in the sodium carbonate solution.

6. A process as claimed in claim 1, wherein the seeds are impregnated with an aqueous solution which has been formed by mixing an aqueous solution of hydrogen peroxide with an aqueous solution of sodium carbonate.

7. A process as claimed in claim 1, wherein the seeds are impregnated with an aqueous solution of hydrogen peroxide and an aqueous solution of sodium carbonate, and the hydrogen peroxide solution and sodium carbonate solution are introduced into the fluidizied bed through the same atomizer.

8. A process as claimed in claim 1, wherein the fluidized bed is maintained at a temperature of from 35° to 95° C.

9. Sodium percarbonate granules produced by the process of claim 1.

10. Sodium percarbonate granules as claimed in claim 9 containing from 0.001 to 5% by weight condensed phosphate.

11. Granules as claimed in claim 10 containing from 0.01 to 2% by weight condensed phosphate.

* * * * *